(12) United States Patent
Huang

(10) Patent No.: US 9,156,399 B2
(45) Date of Patent: Oct. 13, 2015

(54) BRAKE LIGHT SYSTEM AND BRAKE LIGHT

(71) Applicant: HON HAI PRECISION INDUSTRY CO., LTD., New Taipei (TW)

(72) Inventor: Yung-Lun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 42 days.

(21) Appl. No.: 14/149,973

(22) Filed: Jan. 8, 2014

(65) Prior Publication Data

US 2014/0293639 A1  Oct. 2, 2014

(30) Foreign Application Priority Data

Mar. 29, 2013 (TW) .............................. 102111335 A

(51) Int. Cl.
*B60Q 1/44* (2006.01)
(52) U.S. Cl.
CPC ...................................... *B60Q 1/444* (2013.01)
(58) Field of Classification Search
CPC ..................................................... B60Q 1/444
USPC ........................................................... 362/541
See application file for complete search history.

(56) References Cited

U.S. PATENT DOCUMENTS

2006/0103517 A1* 5/2006 Martin .......................... 340/463

* cited by examiner

*Primary Examiner* — David V Bruce
(74) *Attorney, Agent, or Firm* — Novak Druce Connolly Bove + Quigg LLP

(57) ABSTRACT

A braking light system mounted on a road vehicle includes at least one braking light, a power source, a detecting unit, and a controlling unit. The braking light includes a light guide plate, a first light source, and a second light source. The light guide plate includes a first sidewall and a second sidewall and a plurality of holes and depressions to release internal light, the holes are arranged to present a decreasing diameter and decreasing density of holes between the light sources and sidewalls. The controlling unit controls the power source to provide power for the first light source at night, and when the detecting unit detects deceleration, the controlling unit is prompted to further control the power source to provide power for the second light source to emit light to provide an effective visual braking warning to any following driver.

6 Claims, 2 Drawing Sheets

BRAKE LIGHT SYSTEM AND BRAKE LIGHT

BACKGROUND

1. Technical Field

The present disclosure relates to brake lights, and particularly to a brake light system and a brake light.

2. Description of Related Art

Road vehicles have a braking light. The braking light includes a light source and a cover. When a driver depresses a brake pedal to slow or stop the vehicle, the light source emits a light beam to the cover to indicate that the vehicle is braking, thereby avoiding a rear end collision. However, because the brightness of the light beam from the cover is low, it cannot provide an effective warning light for a driver following.

Therefore, what is needed is a braking light system to overcome the above described limitations.

DETAILED DESCRIPTION

Figure 1:
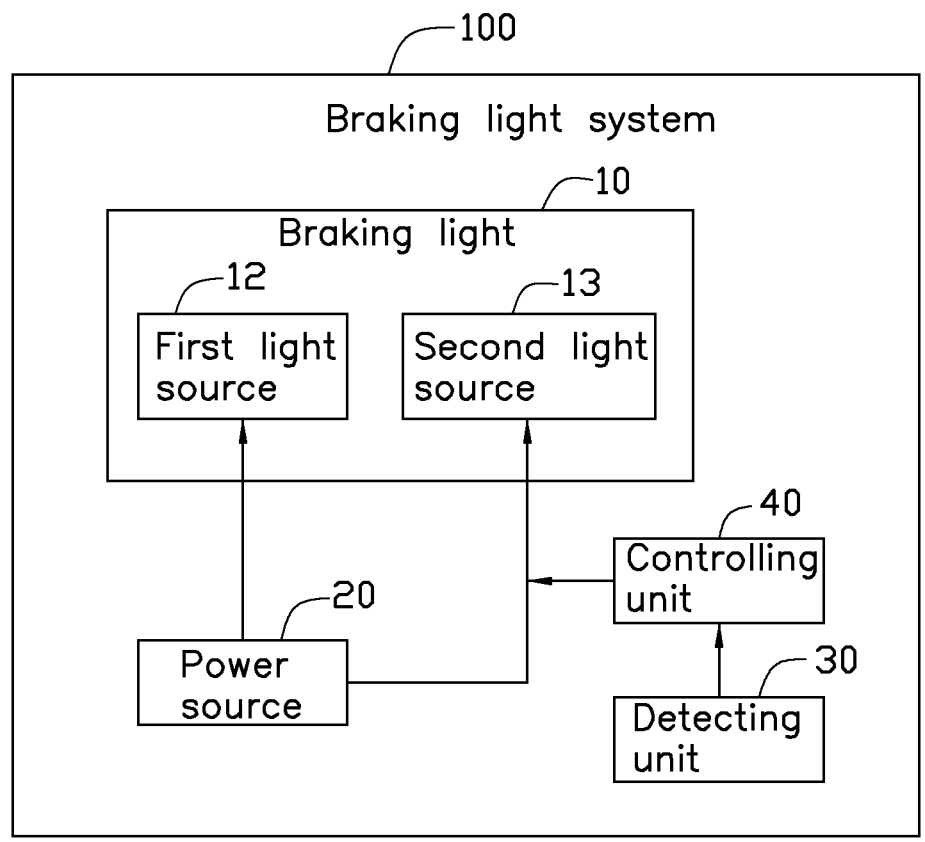
FIG. 1 is a block diagram of one embodiment of a brake light system.

FIG. 1 shows a brake light system 100 mounted on a road vehicle for achieving a warning by lighting. The brake light system 100 includes a number of brake lights 10, a power source 20, a detecting unit 30, and a controlling unit 40. In one embodiment, there are two brake lights 10, and the brake lights 10 are mounted on either side of the rear of the vehicle. In other embodiments, the quantity of the brake lights 10 can be set according to the requirements of the users, and the brake lights 10 can be mounted on other positions of the vehicle, such as the top or sides of the vehicle.

Figure 2:
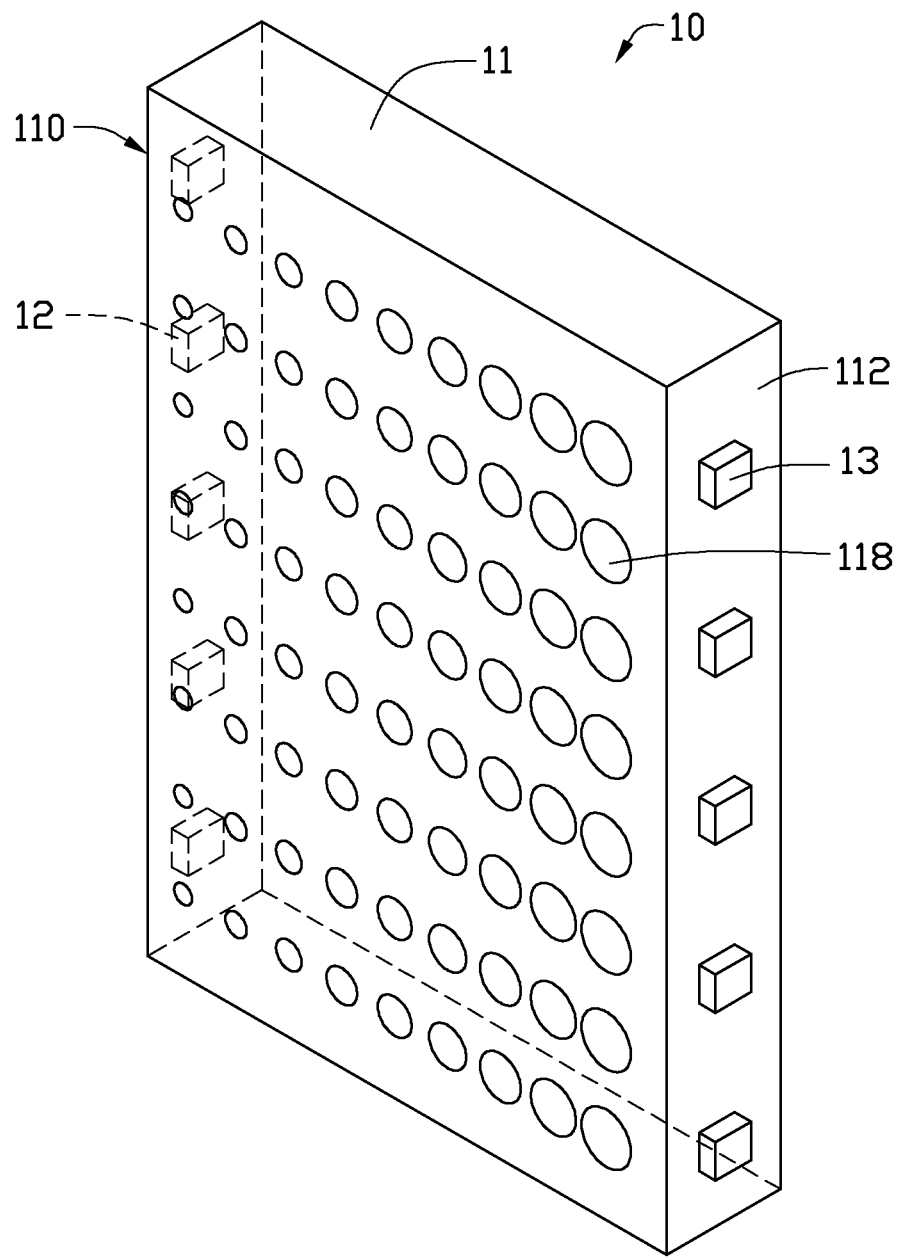
FIG. 2 is an isometric view of a brake light of the brake light system in FIG. 1.

Referring to FIG. 2, each brake light 10 includes a light guide plate 11, a number of first light sources 12, and a number of second light sources 13. In one embodiment, the light guide plate 11 is square shaped or rectangular. The light guide plate 11 includes a first sidewall 110 and a second sidewall 112. The number of first light sources 12 are fixed to the first sidewall 110. The number of second light sources 13 are fixed to the second sidewall 112. The light guide plate 11 further defines a number of holes 118. The diameter of the number of holes 118 gradually decreases along a direction from the second sidewall 112 to the first sidewall 110. A density of the number of holes 118 gradually decreases along the same direction. In one embodiment, the light guide plate 11 is processed to form a matte effect, thereby changing the translucency and brightness of the light guide plate 11.

The power source 20 is electrically connected to the number of first light sources 12 and the number of second light sources 13. The controlling unit 40 controls the power source 20 to provide power for the first light sources 12 to emit the light beams to the first sidewall 110 and for the second light sources 13 to emit the light beams to the second sidewall 112. The light beams from the first light sources 12 enters the light guide plate 11 through the first sidewall 110. The light beams from the second light sources 13 enters the light guide plate 11 through the second sidewall 112. The light beams entering the light guide plate 11 is diffused by the number of holes 118 to form a diffused output of light. In one embodiment, the first light sources 12 and the second light sources 13 are lasers.

When using the brake light system 100, the controlling unit 40 controls the power source 20 to provide power for the first light sources 12 to emit the light beams. The light beams from the first light sources 12 is diffused by the number of holes 118. Because the diameter of the number of holes 118 gradually decreases along a direction from the second sidewall 112 to the first sidewall 110 and the density of the number of holes 118 gradually decreases along the same direction, the brightness of the diffused light is averaged, thereby providing lighting and an effective warning for a driver behind the vehicle.

The detecting unit 30 determines whether or not the moved vehicle is decelerating. The controlling unit 40 controls the power source 20 to provide power for the second light sources 13 to emit the light beams when the vehicle is decelerating. The light beam from the second light sources 13 is diffused by the number of holes 118. Because the diameter of the number of holes 118 gradually decreases along a direction from the second sidewall 112 to the first sidewall 110 and the density of the number of holes 118 also gradually decreases, the brightness of the diffused light gradually increases along the direction from the first sidewall 110 to the second sidewall 112, thereby warning a following driver that the vehicle is being braked to increase the chance of avoiding a rear end collision.

Although various embodiments have been specifically described, the disclosure is not to be construed as being limited thereto. Various changes or modifications may be made to the embodiments without departing from the scope and spirit of the disclosure.

What is claimed is:

1. A braking light system being mounted on a road vehicle, comprising:
   at least one braking light comprising:
      a light guide plate comprising a first sidewall and a second sidewall opposite to the first sidewall and defining a plurality of holes, wherein the diameter of the holes gradually decreases along a direction from the second sidewall to the first sidewall, and the density of the holes gradually decreases along a direction from the second sidewall to the first sidewall;
      at least one first light source fixed to the first sidewall; and
      at least one second light source fixed to the second sidewall;
   a power source electronically connected to the at least one first light source and the at least one second light source;
   a detecting unit configured to determine whether the vehicle is decelerating; and
   a controlling unit configured to control the power source to provide power for the first light source to emit light in response to a user operation, and to control the power source to provide power for the second light source to emit light when the vehicle is decelerating.

2. The braking light system as described in claim 1, wherein the least one light source and the least one second light source are lasers.

3. The braking light system as described in claim 1, wherein the at least one braking light is mounted on a rear of the vehicle.

4. The braking light system as described in claim 1, wherein the quantity of the at least one braking light is two.

5. A braking light comprising:
   a light guide plate comprising a first sidewall and a second sidewall opposite to the first sidewall and defining a plurality of holes, wherein the diameter of the holes gradually decreases along a direction from the second sidewall to the first sidewall, and the density of the holes gradually decreases along a direction from the second sidewall to the first sidewall;
   at least one first light source fixed to the first sidewall; and at least one second light source fixed to the second sidewall.

6. The braking light as described in claim 5, wherein the least one light source and the least one second light source are lasers.

\* \* \* \* \*